United States Patent [19]

Maes et al.

[11] Patent Number: 4,542,036

[45] Date of Patent: Sep. 17, 1985

[54] PROCESS FOR SEPARATING SOLIDS FROM OILS

[76] Inventors: Pieter J. Maes, Tuinstraat 41, B-8730 Harelbeke; Albert J. Dijkstra, Albijn Vanden Abeelelaan, 2, B-8500 Kortrijk, both of Belgium

[21] Appl. No.: 628,785

[22] Filed: Jul. 9, 1984

Related U.S. Application Data

[63] Continuation of Ser. No. 473,620, Mar. 9, 1983, abandoned.

[30] Foreign Application Priority Data

Mar. 16, 1982 [GB] United Kingdom ................. 8207612

[51] Int. Cl.[4] ........................... A23D 5/00; C09F 5/02

[52] U.S. Cl. .................................... 426/601; 210/781; 210/787; 260/412.2; 494/37

[58] Field of Search .................. 210/781, 787; 494/37; 426/601; 260/412, 412.2, 412.4

[56] References Cited

U.S. PATENT DOCUMENTS

| | | | |
|---|---|---|---|
| 2,727,629 | 12/1955 | Hertrich | 210/781 |
| 2,807,411 | 9/1957 | Ayres | 494/37 |
| 3,670,888 | 6/1972 | Boroughs et al. | 210/781 |
| 4,009,290 | 2/1977 | Okumori et al. | 260/412.2 |
| 4,298,160 | 11/1981 | Jackson | 494/37 |
| 4,341,713 | 7/1982 | Stolp et al. | 260/412.2 |

FOREIGN PATENT DOCUMENTS

| | | |
|---|---|---|
| 973457 | 10/1964 | United Kingdom . |
| 1013365 | 12/1965 | United Kingdom . |
| 1120456 | 7/1968 | United Kingdom . |

*Primary Examiner*—Benoit Castel

[57] ABSTRACT

An edible oil mixture containing a liquid phase and crystalline solids is at least partially separated by centrifugal separation. In the process the centrifugal force is sufficiently high to cause separation of liquid from solid so that the liquid is removed from solid and the space occupied by the liquid is replaced by the atmosphere. The average period of time during which the solid components are subjected to the centrifugal force is less than 2 minutes and the solids cake formed is continuously advanced mechanically or centrifugally or by a combination of both over a surface in a direction which is at an angle relative to the direction of the centrifugal force.

6 Claims, No Drawings

PROCESS FOR SEPARATING SOLIDS FROM OILS

This is a continuation, of application Ser. No. 473,620, filed Mar. 9, 1983, now abandoned.

This invention relates to a process for separating an oil containing solids into a liquid fraction and a solids fraction by applying a centrifugal force onto the solids under such conditions that the liquid is forced away from the solids fraction and collected separately. The process is particularly suitable in the fractionation of edible oils because the resulting solids fractions exhibit a low residual liquid oil content.

Winterization and fractionation of edible oils are commonly used processes whereby the oil is cooled to a temperature at which higher melting components precipitate as crystals which have then to be removed from the oil.

The process most commonly used for the separation of the solids from oil is by filtration. Band filters, vacuum drum filters or filter presses are used for this purpose.

The use of a centrifuge has also been suggested for the separation of solids from oils. British patent specification No. 973,457 describes the use of a centrifuge in which the solids having a higher density than the oil accumulate at the periphery of the zone of centrifugation and are intermittently and automatically extruded outwardly through an opening in this periphery.

British patent specification No. 1,013,365 also mentions centrifuging as a suitable separation method without specifying the type of centrifuge used, and a more recent review article (JAOCS 59, 169–174 (1981)) refers to the use of a centrifuge in winterization. The centrifuge used is a solid bowl centrifuge that is intermittently emptied when a sufficient amount of solids has accumulated.

All these processes are relying upon the fact that the solids to be removed from the oil have a density that is higher than that of oil so that the solids accumulate and are compacted under centrifugal force. During this compacting the residual oil content of the solids is diminished as happens also when a filter cake is compressed in a filter press.

At a meeting of the American Oil Chemists Society in Chicago from 15th to 18th October 1967 a paper was presented by D. D. Horton describing the use of batch basket centrifuges for separating solid stearine from salad oil. It was proposed to use speeds resulting in forces of 450 g of less (g=unit force of gravity). Oil with suspended stearine is fed to the basket which is rotated and oleine separates and flows though the screen. When a cake of stearine has accumulated, the machine is run for a time without further feed to drain the oleine from the stearine cake, the latter is then discharged and the cycle recommenced. The solid stearine components in the basket before discharge are subjected to centrifugal forces for at least two minutes.

This technique does not appear to have been put into extensive commercial practice. The use of higher rotation speeds has been believed to lead to a rise in temperature and a consequent loss of stearine by melting. In fact, current recommendations for the use of centrifuges in the edible oil industry are limited to the removal of suspended solids such as seed particles using a screen centrifuge or the classification of oils using a solid bowl centrifuge.

In British patent specification No. 1,120,456 there is described a centrifuging technique in which cooled oil containing suspended stearine, with a diluent such as hexane, is treated in a conventional centrifuge. The force applied is 1000 to 10,000 g. According to the specification, the use of a diluent is essential, because without it frictional effects within the undiluted oil cause a temperature rise which is sufficient to melt the stearine crystals. The patent specification reaches the conclusion that centrifugal separation is not practical in the treatment of undiluted oil.

In spite of this contrary evidence on their utility, centrifugal separation techniques have been further investigated and most surprisingly it has been found possible to devise a centrifugal separation process which is effective on a practical scale, which does not require the use of diluents and which provides an efficient technique for the separation of solids from oil, e.g. of stearine from oleine.

Quite unexpectedly it has further been found that solids with a considerably lower oil content are obtained by using the novel process of this invention. The filter cake of conventional separation processes has the appearance of a dry powder and it has been assumed that the residual oil is present in the form of mixed crystals so that a further purification with mechanical means should not be possible, compare C. Deroanne, "Contribution a l'étude de la cristallisation des glycerides", Gembloux, 1974/75, page 173. It has therefore been highly surprising to find that the solids content is increased to about 60% by weight and that the oil yield is accordingly improved when using the process of this invention. The prior art filtration processes yield a "dry" filter cake with only 30% by weight solids and a residual oil content of about 70% by weight. By the use of compression filtration this can only be improved to a solids content of about 40% by weight.

Accordingly the present invention is a process for at least partially separating the liquid and solid components of an edible oil mixture containing a liquid phase and crystalline solids by centrifugal separation, in which the centrifugal force is sufficiently high to cause separation of liquid from solid and in which liquid is removed from solid and the space occupied by the liquid is replaced by the atmosphere which is characterized in that the average period of time during which the solid components are subjected to the centrifugal force is less than 2 minutes and that the solids cake formed is continuously advanced mechanically or centrifugally or by a combination of both over a surface in a direction which is at an angle relative to the direction of the centrifugal force.

The term "average" is used because the process of the invention includes operations in which part of the product may emerge quickly from the processing equipment while other parts may be retained for a somewhat longer time.

Preferably the solids cake is advanced in a direction which is at an angle of 45° or more relative to the direction of the centrifugal force.

The process of the invention is preferably carried out using a minimum centrifugal force of 450 g. The term "minimum" is used because several suitable processing machines use conical separators which result in a variable force depending upon the diameter of the rotating part at a given point.

The atmosphere will normally be air but may be another gas, which may serve a protective function, e.g. nitrogen.

It has been found that a more complete separation of oils from solids is achieved by this method than by conventional filtration of centrifuging, under conditions described in the above references. In particular the low and in some cases very low residence times allow commercially advantageous throughputs of the products without the risk that part of the solid components melts under the high forces applied.

Below the invention will primarily be described with reference to the separation of solid crystalline stearine from stearine/oleine mixtures. Such mixtures are obtained in the fractionation of palm oil. However, the process can also be used for the separation of other oil mixtures, examples being the separation of higher saturated triglycerides from partially hydrogenated soy bean oil and the separation of crystalline wax from sun-flower oil.

It is believed that the success of the process of this invention is based on the fact that it uses very thin solids layers which in turn allow the use of rather high centrifugal forces and short residence times. Quite surprisingly it has namely been found that with thicker solids layers the separation efficiency decreases with increasing g values, probably because the solids layers are too highly compacted to allow the liquid components to penetrate them and to drain therefrom. If a mixture is subjected to high g values for a longer time this may also result in an undesirable melting of part of the solid material. Hitherto it has been considered necessary to avoid high g values and to use long spinning times in order to obtain satisfactory separation of oil mixtures in a centrifuge.

The invention excludes the use of basket centrifuges in which the residence time is usually longer than two minutes. This is too long for commercial practice and is discontinuous. The centrifugal force is also normally too low and the solids cake is not advanced over a surface at an angle relative to the direction of the centrifugal force.

A first mode of operation of the process employs a solid bowl decanter. Such a decanter has a cylindrical section and a conical section and a co-rotating scroll. If a solids-containing liquid oil is introduced through the axis into the rotating bowl it conforms to the cylindrical shape with the solids at the outer periphery of the cylinder. Because of the speed differential between the bowl and the scroll, the solids are scraped out of the liquid into the conical section where they are still subjected to the centrifugal force. This force causes the liquid entrapped between the solids particles to flow back into the cylindrical section and out of the bowl at its other end whereas the solids are conveyed further into the cone and discharged. The solids cake is advanced over the cylinder and cone surfaces towards the discharge end. Said surfaces are at an angle of up to 90° relative to the direction of the centrifugal forces. The decanter has the advantage of continuous operation, but on the other hand does not always yield a perfectly clear oil. The preferred average residence time of the solid stearine when using a solid bowl decanter is 3 to 50 seconds and the preferred speed of rotation is such as to generate a centrifugal force of at least 2000 g at the widest rotating part.

Normally residence times will be known from manufacturer specifications or they can be calculated to provide an estimate based on physical parameters of the equipment.

When using a decanter, the solids minimum residence time may be determined experimentally by measuring the time elapsed between the beginning of feeding and the first solids material leaving the bowl, starting up with a machine containing only liquid phase. The solids maximum residence time is the time elapsed between the moment the feeding has been stopped and the moment no more solids leave the bowl. The solids average residence time is the mean of these values.

A second piece of equipment that can be used to operate the process is a conical sieve centrifuge. The oleine containing the solids to be removed is fed into the rotating perforated cone near its apex and is spread across the inside of the cone surface because of the centrifugal force. This force causes the oleine and the solids to travel over the surface to the open and wide end of the cone and the oleine flows through the perforations of the cone. The perforation size is chosen such that solids do not pass through but travel over the surface across the entire length of the cone, leave it and are collected separately. By careful selection of the cone apex angle relative to the direction of the centrifugal forces, speed of rotation and screen size it has been found possible to attain a situation whereby most of the oleine is drained off near the apex of the cone and residual oleine leaves near the wide end of the cone. Again the solids in the oleine are subjected to a centrifugal force under conditions whereby the oleine can leave the solids.

The average residence time of the solids is preferably from 1 to 30 seconds. The preferred centrifugal force is at least 500 g. The residence time can be estimated from the cake thickness and throughput, as explained in the examples below.

A useful improvement in the performance of the conical sieve centrifuge is obtained by the inclusion in the equipment of a co-rotating scroll capable of rotation at a speed differential to the screen. Preferably the difference is quite small, for example 0.3 to 3%. With such equipment the average residence time may be reduced further to less than 5 seconds and even below 1 second since the solids cake is then advanced over the surface both mechanically and centrifugally.

The process can advantageously be used when winterizing edible oils. Because of the low residual oleine content of the separated solids, the oil yield of the winterization process improves. In dry fractionation processes such as the fractionation of palm oil, edible tallow, butter oil and other dry fractionation processes such as winterization of cotton seed oil or partially hydrogenated soy bean oil, the separation process also leads to an improved yield of the salad oil, but in addition the process causes the solids fraction, the stearine, to be different from the stearine obtained by conventional filtration. Using the process according to the invention a palm stearine with an iodine value below 30 can be produced using dry fractionation whereas with band filitration iodine values around 40 are usual. This indicates that contrary to prior assumptions the crystallization of stearine is actually quite selective. The temperature at which the separation process is carried out is determined by the oil feedstock and the desired characteristics of the oleine.

Added solvents may be used to enhance the separation but are not normally required. In such solvent fractionation processes the low residual liquid content of the solids separated according to the invention permits the use of a lower solvent to fat ratio which results in an increase in plant capacity and a decrease in solvent distillation costs, without effecting the fractionation quality. Where a decanter is used a washing solvent may be applied to the separated stearine as it progresses along the conical section of the bowl to further enhance the selectivity of the fractionation.

The following examples serve to further illustrate the invention.

EXAMPLE 1

Bleached and deodorized palm oil was heated to 80° C. and cooled rapidly to 40° C. and held at that temperature for 5 hours. Thereafter it was cooled at a rate of 1.5° C./hr to 31° C. and the resulting slurry of crystals was filtered on a continuous band filter (Fractionnement Tirtiaux, Fleurus, Belgium) to yield 15 wt % of palm stearine of iodine value 39.5 and 85 wt % of palm oleine.

When this same slurry was fed to a decanter (Sharples Pennwalt, model P 600) rotating at 6000 rpm and using the lowest differential speed between bowl and scroll (about 25 rpm) and weir no. 2, the iodine value of the stearine dropped to 29.9 at a slurry feed rate of 106 l/hr and to 31.2 at a feed rate of 250 l/hr. The oleine yield increased to above 90%; the oleine was almost clear.

Lowering the speed of rotation to 5000 rpm caused the iodine value of the stearine to increase and the oleine to become more cloudy indicating a deterioration in the separation.

With weir no. 2 the volume of product in the decanter is approx. 0.75 l so that at a feed rate of 106 l/hr the average residence time of the product is about 25 seconds. Because the product is fed into the decanter somewhere along its axis and the solid fraction is not spread evenly along the bowl inner surface but transported toward the solids exit, a shorter residence time for the solids results than for the product as a whole. For this particular item of equipment an average solids residence time of only 7 seconds is estimated.

EXAMPLE 2

A palm oleine obtained by filtration at 22° C. was further fractionated by heating to 70° C., rapidly cooling to 20° C., keeping it at that temperature for 5 hours and slowly cooling at a rate of 1° C./hr to 15° C. in order to produce a palm mid fraction. Filtration of the slurry on a Tirtiaux band filter produced a solids fraction of iodine value 55.0 in a yield of about 45 wt %. When this mid fraction was fed to a conical sieve centrifuge (Nivoba, Veendam, The Netherlands) rotating at 1800 rpm and provided with a screen with slits of 60 microns, the resulting solids fraction had an iodine value of 43.7–47.0 and was obtained in an overall yield of about 20 wt %, thus raising the oleine yield from 55 to about 80 wt %; the oleine had an iodine value of 59.0. The feed rate in this experiment was 1.5 t/hr. Assuming an average filter cake layer thickness of 1 mm and given the filter area of 0.6 $m^2$, a cake density of 0.76 kg/l, and a cake yield of 20 wt % this corresponds to an estimated average residence time for the solid of 5.5 sec.

EXAMPLE 3

A palm oleine fraction of iodine value 56 was fed to a band filter to yield 35 wt % of a palm mid fraction of iodine value 47 and a second oleine fraction of iodine value 61. When this palm oleine fraction was fed to a conical sieve centrifuge (Sharples Super Screen M 300) provided with a 100 micron screen rotating at 3000 rpm and a conical scroll rotating at 3060 rpm whereby the clearance between screen and scroll was 0.3 mm, the resulting mid fraction had an iodine value of only 41 and was produced in a yield of 25 wt %; the second oleine again had an iodine value of 61.

The feed rate in this experiment was 1.5 t/hr and thus led to the production of 375 kg stearine/hr. Given the filter area of 0.1341 $m^2$ and the cake density of 0.75 kg/l and an assumed cake layer thickness equal to the clearance of 0.3 mm, the average residence time of the solid can be estimated at 0.3 sec.

This estimate, however, assumes that no solid material is retained between the scroll flights, which possible retention would increase the average residence time. On the other hand, if the layer thickness is less than the clearance a shorter residence time will result.

We claim:

1. A centrifugal separation process for at least partially separating liquid and solid components of an edible oil mixture containing a liquid phase and crystalline solids, said process comprising subjecting said edible oil mixture to a centrifugal force of at least 2000 G for an average period of time from 3 to 50 seconds in a solid bowl decanter including a cylindrical section, a conical section and a scroll capable of rotating at a differential speed relative to said bowl so as to separate said liquid phase from said crystalline solids whereby a solids cake is formed and whereby the liquid phase removed from said crystalline solids is replaced by the atmosphere, and continuously advancing, mechanically or centrifugally or by a combination of both, the resulting solids cake over a surface which is at an acute angle relative to the direction of the centrifugal force.

2. The process of claim 1 wherein the solids cake is advanced over a surface which is at an angle of 45° or more relative to the direction of the centrifugal force.

3. A centrifugal separation process for at least partially separating liquid and solid components of an edible oil mixture containing a liquid phase and crystalline solids, said process comprising subjecting said edible oil mixture to a centrifugal force of at least 500 G for an average period of time from 1 to 30 seconds in a conical sieve centrifuge so as to separate said liquid phase from said crystalline solids whereby a solids cake is formed and whereby the liquid phase removed from said crystalline solids is replaced by the atmosphere, and continuously advancing, mechanically or centrifugally or by a combination of both, the resulting solids cake over a surface which is at an acute angle relative to the direction of the centrifugal force.

4. The process of claim 3 wherein the solids cake is advanced over a surface which is at an angle of 45° or more relative to the direction of the centrifugal force.

5. A centrifugal separation process for at least partially separating liquid and solid components of an edible oil mixture containing a liquid phase and crystalline solids, said process comprising subjecting said edible oil mixture to a centrifugal force of at least 500 G for an average period of time less than 5 seconds in a conical sieve centrifuge provided with a scroll capable of rotating at a speed differential relative to the screen, so as to separate said liquid phase from said crystalline solids whereby a solids cake is formed and whereby the liquid phase removed from said crystalline solids is replaced by the atmosphere, and continuously advancing, mechanically or centrifugally or by a combination of both, the resulting solids cake over a surface which is at an acute angle relative to the direction of the centrifugal force.

6. The process of claim 5 wherein the solids cake is advanced over a surface which is at an angle of 45° or more relative to the direction of the centrifugal force.

* * * * *